(12) United States Patent
Mittleider (10) Patent No.: US 10,514,067 B2
(45) Date of Patent: Dec. 24, 2019

(54) WINDMILL DRIVE ADAPTER

(71) Applicant: Cory Mittleider, Sioux Falls, SD (US)

(72) Inventor: Cory Mittleider, Sioux Falls, SD (US)

(\*) Notice: Subject to any disclaimer, the term of this patent is extended or adjusted under 35 U.S.C. 154(b) by 227 days.

(21) Appl. No.: 15/651,603

(22) Filed: Jul. 17, 2017

(65) Prior Publication Data

US 2018/0023627 A1     Jan. 25, 2018

Related U.S. Application Data (60) Provisional application No. 62/362,621, filed on Jul. 15, 2016.

(51) Int. Cl.
*F16D 1/033* (2006.01)
*F03D 15/00* (2016.01)

(52) U.S. Cl.
CPC ............. *F16D 1/033* (2013.01); *F03D 15/00* (2016.05); *F05B 2260/403* (2013.01); *F16D 2250/0084* (2013.01); *F16D 2300/12* (2013.01); *Y02E 10/72* (2013.01)

(58) Field of Classification Search
CPC .. F16D 1/033; F16D 2250/0084; F03D 15/00; F05B 2260/403
See application file for complete search history.

(56) References Cited

U.S. PATENT DOCUMENTS

| | | |
|---|---|---|
| 2,617,672 A | 11/1952 | Nichols |
| 3,143,366 A | 8/1964 | Nichols |
| 3,434,747 A | 3/1969 | Nichols |
| 6,285,090 B1 | 9/2001 | Brutsaert et al. |
| 2016/0025073 A1* | 1/2016 | Fujiwara .............. F03D 15/00 416/169 R |
| 2017/0067513 A1* | 3/2017 | Marks ...................... F16D 3/78 |
| 2018/0023627 A1* | 1/2018 | Mittleider ............... F16D 1/033 403/337 |

\* cited by examiner

*Primary Examiner* — Vicky A Johnson (57) ABSTRACT

A windmill drive adapter assembly converts a male-female windmill drive coupling to a male-male windmill drive coupling. The windmill drive adapter assembly includes a gearbox hub lock secured to a gearbox shaft extending from a gearbox assembly. A gearbox drive plate engages the gearbox hub lock to rotate with the gearbox shaft. A motor hub lock is secured to a motor shaft extending from a motor assembly. The motor hub lock is coupled to a motor drive plate such that the motor hub lock and the motor drive plate rotate together. The motor drive plate is coupled to the gearbox drive plate. An adapter couples to the gearbox assembly and the motor assembly and is positioned around the motor drive plate and the gearbox drive plate. A method of conversion is also disclosed.

12 Claims, 7 Drawing Sheets

WINDMILL DRIVE ADAPTER

CROSS-REFERENCE TO RELATED APPLICATIONS

This application claims priority of the provisional application 62/362,621 filed on Jul. 15, 2016.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM.

Not Applicable

STATEMENT REGARDING PRIOR DISCLOSURES BY THE INVENTOR OR JOINT INVENTOR

Not Applicable

BACKGROUND OF THE INVENTION (1) Field of the Invention.

(2) Description of Related Art including information disclosed under 37 CFR 1.97 and 1.98.

The disclosure and prior art relates to drive adapters and more particularly pertains to a new drive adapter for converting a male-female windmill drive coupling to a male-male windmill drive coupling.

BRIEF SUMMARY OF THE INVENTION

An embodiment of the disclosure meets the needs presented above by generally comprising a gearbox hub lock secured to a gearbox shaft extending from a gearbox assembly. A gearbox drive plate is engaged by the gearbox hub lock to rotate with the gearbox shaft. A motor hub lock is secured to a motor shaft extending from a motor assembly. The motor hub lock is coupled to a motor drive plate such that the motor hub lock and the motor drive plate rotate together. The motor drive plate is coupled to the gearbox drive plate. An adapter couples to the gearbox assembly and the motor assembly and is positioned around the motor drive plate and the gearbox drive plate.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 8 thereof, a new drive adapter embodying the principles and concepts of an embodiment of the disclosure and generally designated by the reference numeral 10 will be described.

As best illustrated in FIGS. 1 through 8, the windmill drive adapter assembly 10 replaces a male-female connection in a pre-existing windmill drive coupling with a male-male drive coupling to enhance durability. The windmill drive adapter assembly 10 generally comprises a gearbox hub lock 12 of conventional design configured for being secured to a gearbox shaft 14 extending from a gearbox assembly 16. Typically, the gearbox shaft 14 is a conventional male shaft installed as a replacement for a female connector originally present as part of the gearbox assembly 16. The gearbox hub lock 12 engages a gearbox drive plate 18 wherein the gearbox drive plate 18 is configured to rotate with the gearbox shaft 14. The gearbox drive plate 18 has a planar disc section 20. Similarly, a motor hub lock 22 is configured for being secured to a motor shaft 24 extending from a motor assembly 26. The motor assembly 26 is conventional and may be a new, repaired, or pre-existing motor being engaged by the windmill drive adapter assembly 10. The motor hub lock 22 is coupled to a motor drive plate 28 such that the motor hub lock 22 and the motor drive plate 28 rotate together. The motor drive plate 28 is coupled to the gearbox drive plate 18 to complete the male to male connection.

Each of a plurality of couplers 50 is coupled to the planar disc section 20. The plurality of couplers 50 is positioned inset into the planar disc section 20 to reduce the space required when converting to the male-male connection. This also provides for a planar surface facing the gearbox assembly 16. The couplers 50 may be bolts coupled to the gearbox drive plate 18 or integral threaded apertures or the like. Each of a plurality of fasteners 52 is engageable to an associated one of the couplers 50. Each of a plurality of apertures 54 extends through the motor drive plate 28. Each of the apertures 54 is aligned with a respective one of the couplers 50. Each of the fasteners 52 is extended through an associated one of the apertures 54 to engage the associated one of the couplers 50 wherein the fasteners 54 couple the motor drive plate 28 to the gearbox drive plate 18.

An adapter 30 has a first end 32 configured for coupling to the gearbox assembly 16 and a second end 34 configured for coupling to the motor assembly 26. The adapter 30 is positioned around the motor drive plate 28 and the gearbox drive plate 18 such that the adapter 30 secures the gearbox drive plate 18 and the motor drive plate 28 in alignment with the gearbox assembly 16 and the motor assembly 26. The adapter 30 more specifically provides a first end plate 36 and a second end plate 38, each having a respective central opening 40,42. Each of a plurality of spacers 44 is coupled to and extends between the first end plate 36 and the second end plate 38. The spacers 44 are radially arranged and spaced around a perimeter 46 of the adapter 30 wherein the adapter 30 has an open peripheral sidewall 48 wherein each of the fasteners 54 is engageable to the associated one of the couplers 50 while the gearbox drive plate 18 is positioned within the adapter 30.

A coupling disc pack 56 and motor hub 58 may be positioned between and couple the motor hub lock 22 to the motor drive plate 28 to accommodate variations in alignment. The connections as described above may also incorporate oil seals 74, snap rings 76, and bearings 78 in conventional manners.

Figure 1:
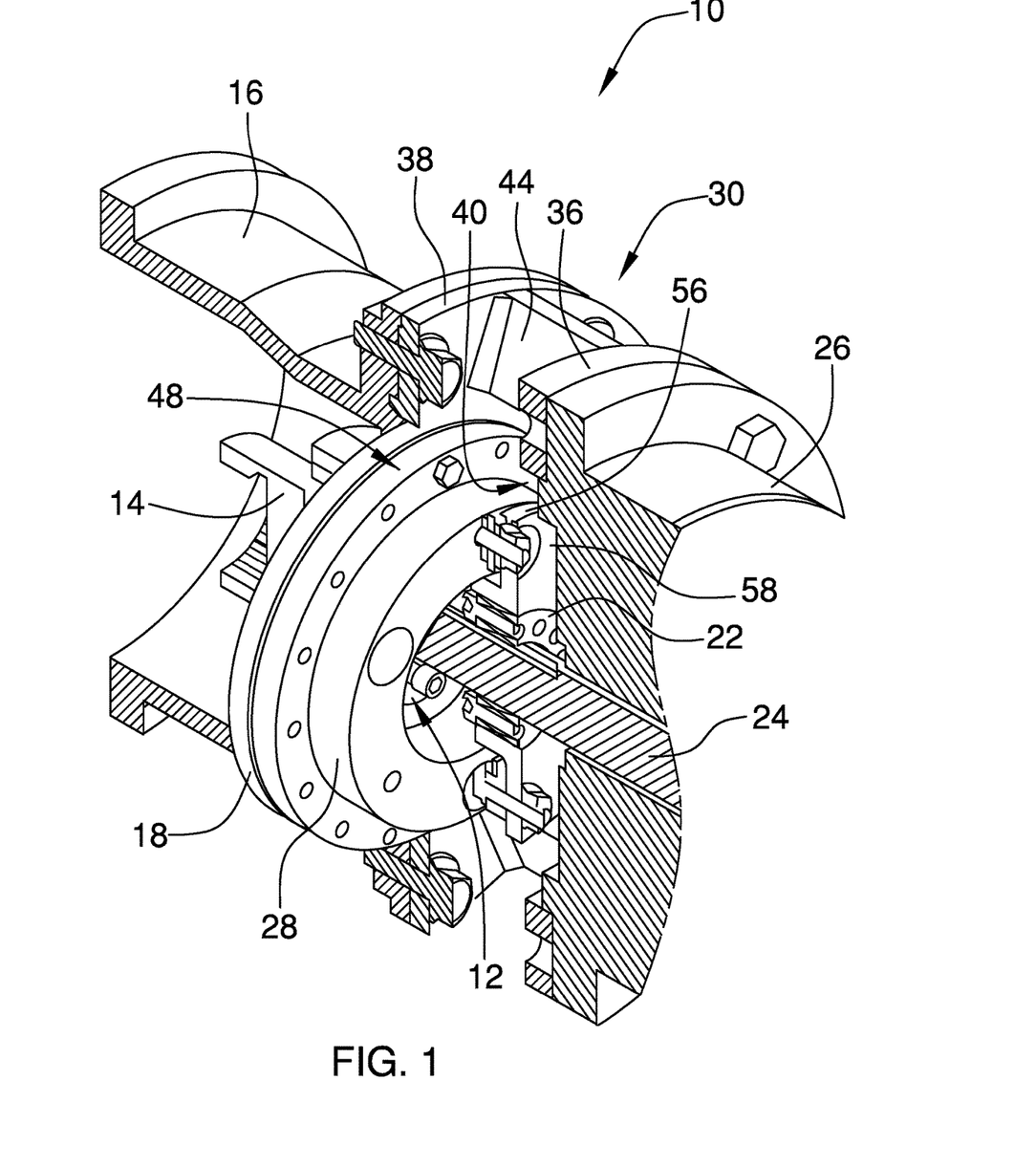
FIG. 1 is a partial cut-away top front side perspective view of a windmill drive adapter assembly according to an embodiment of the disclosure.
Figure 2:
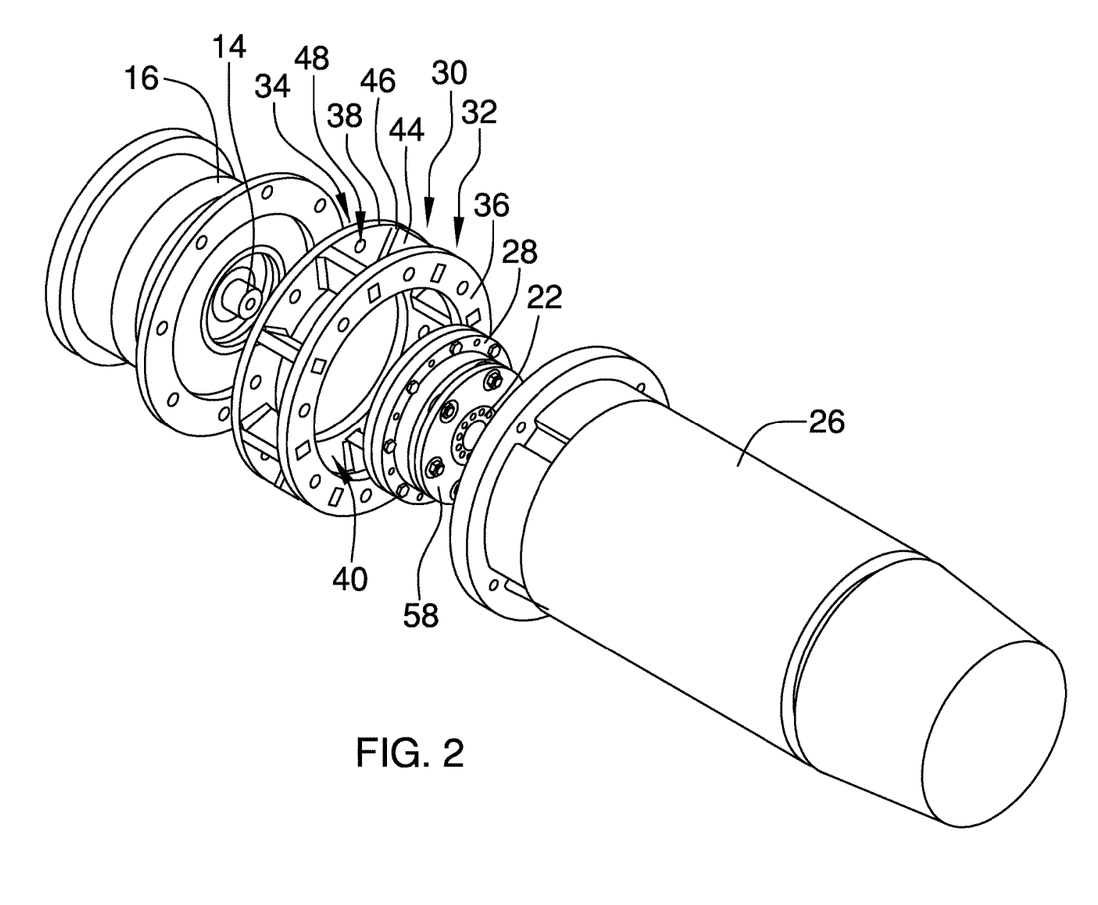
FIG. 2 is a partially exploded top front side perspective view of an embodiment of the disclosure.
Figure 3:
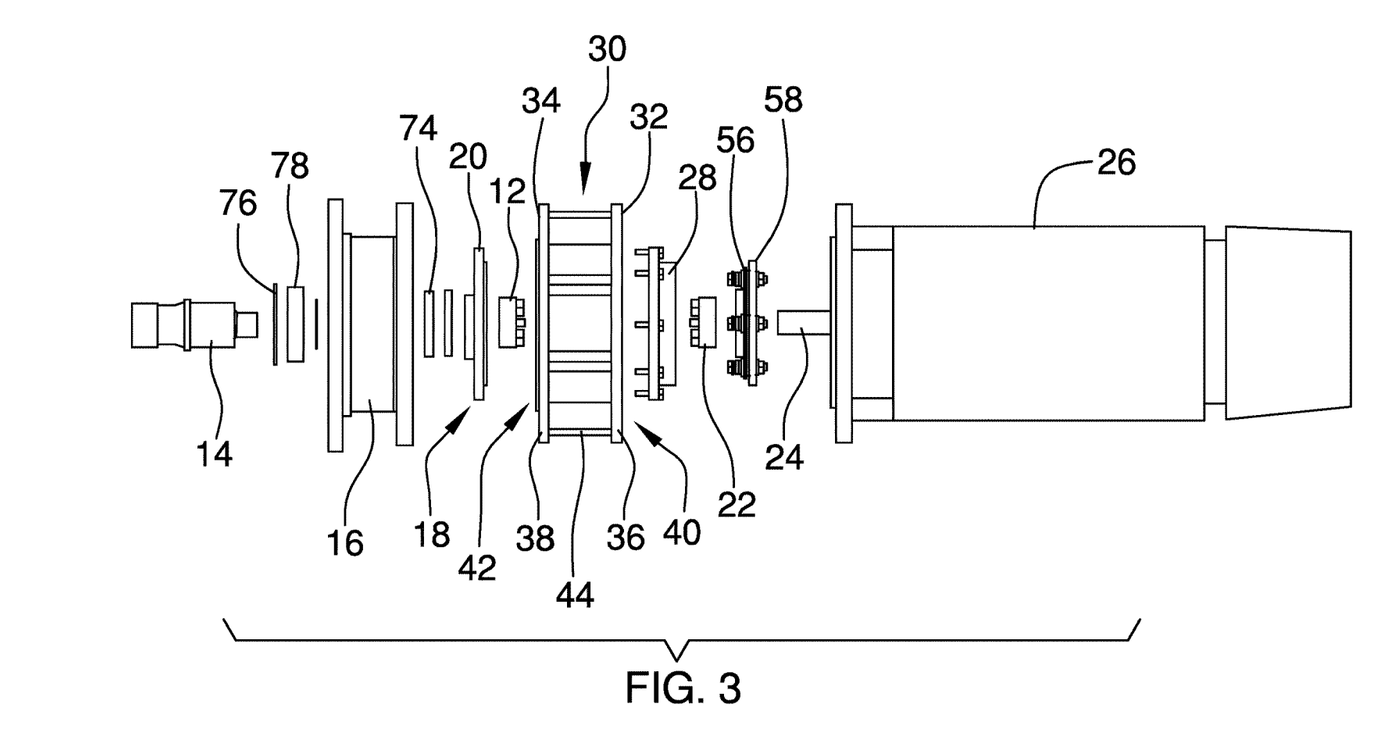
FIG. 3 is a partially exploded front view of an embodiment of the disclosure.
Figure 4:
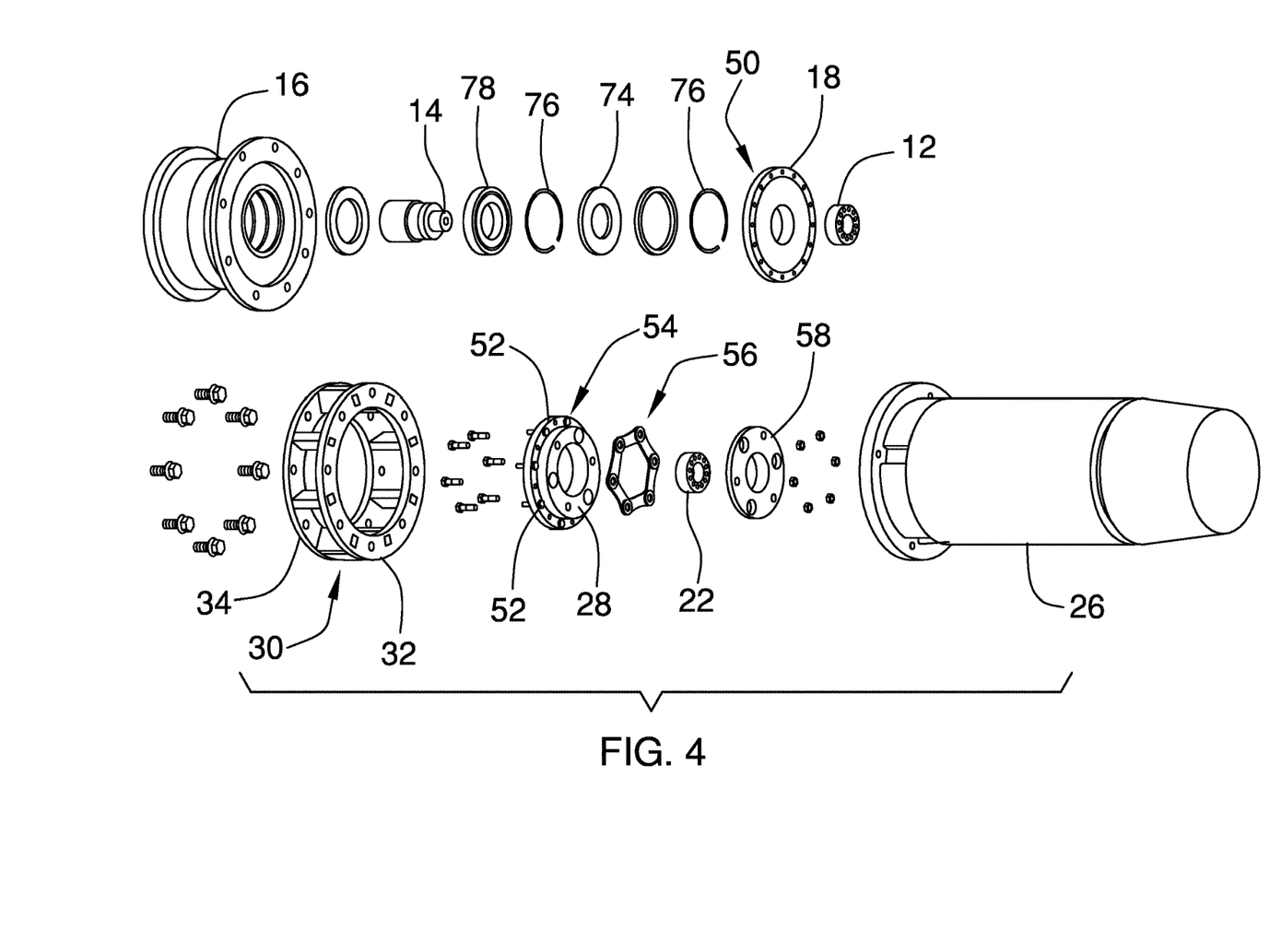
FIG. 4 is an exploded top front side perspective view of an embodiment of the disclosure.
Figure 5:
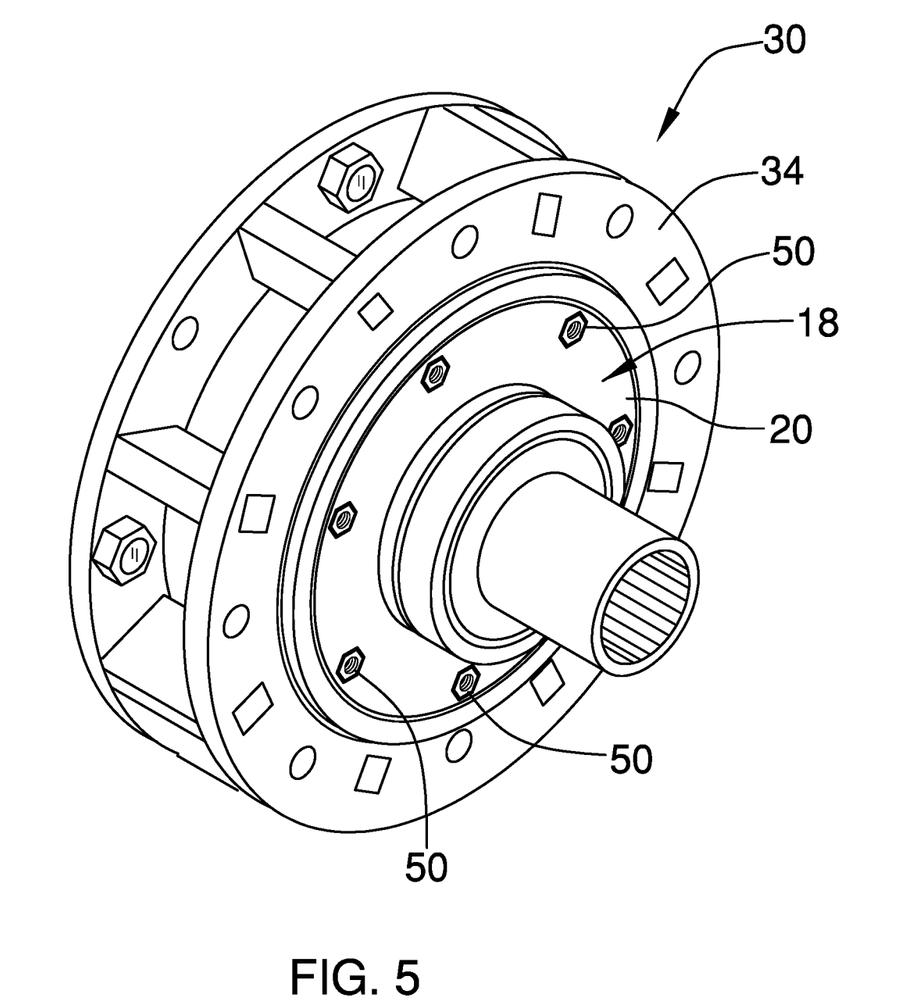
FIG. 5 is a partial top rear side perspective view of a gearbox drive plate and adapter of an embodiment of the disclosure.
Figure 6:
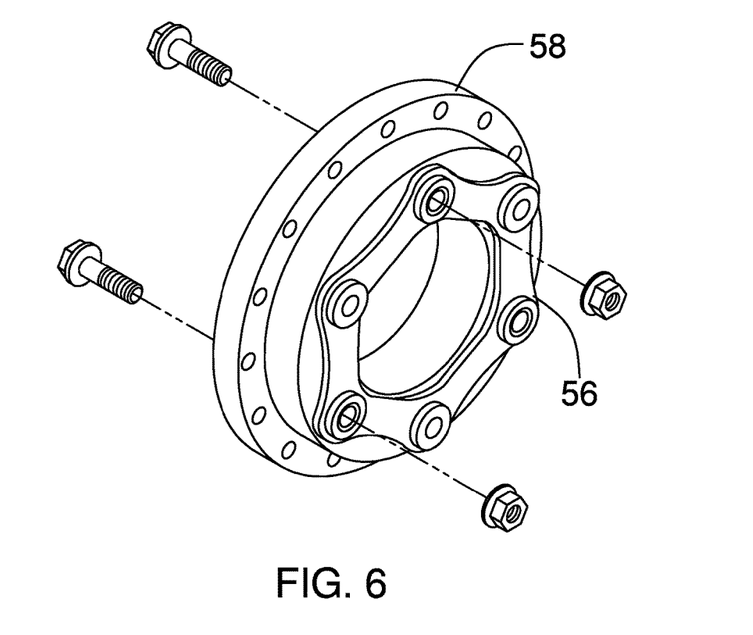
FIG. 6 is a top front side perspective view of a coupling disc pack of an embodiment of the disclosure.
Figure 7:
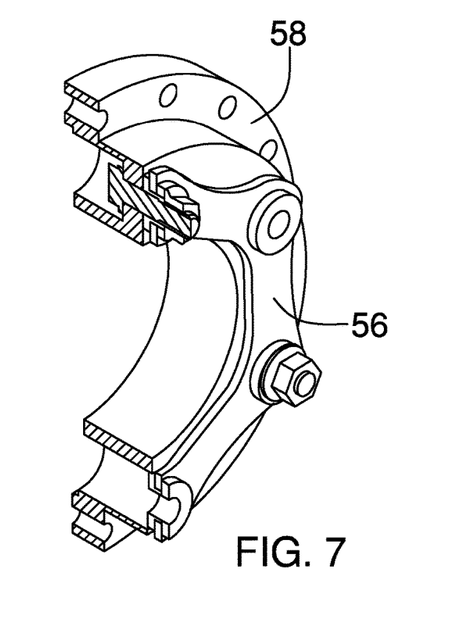
FIG. 7 is a cross-sectional view similar to a view taken along line 7-7 of FIG. 6.
Figure 8:
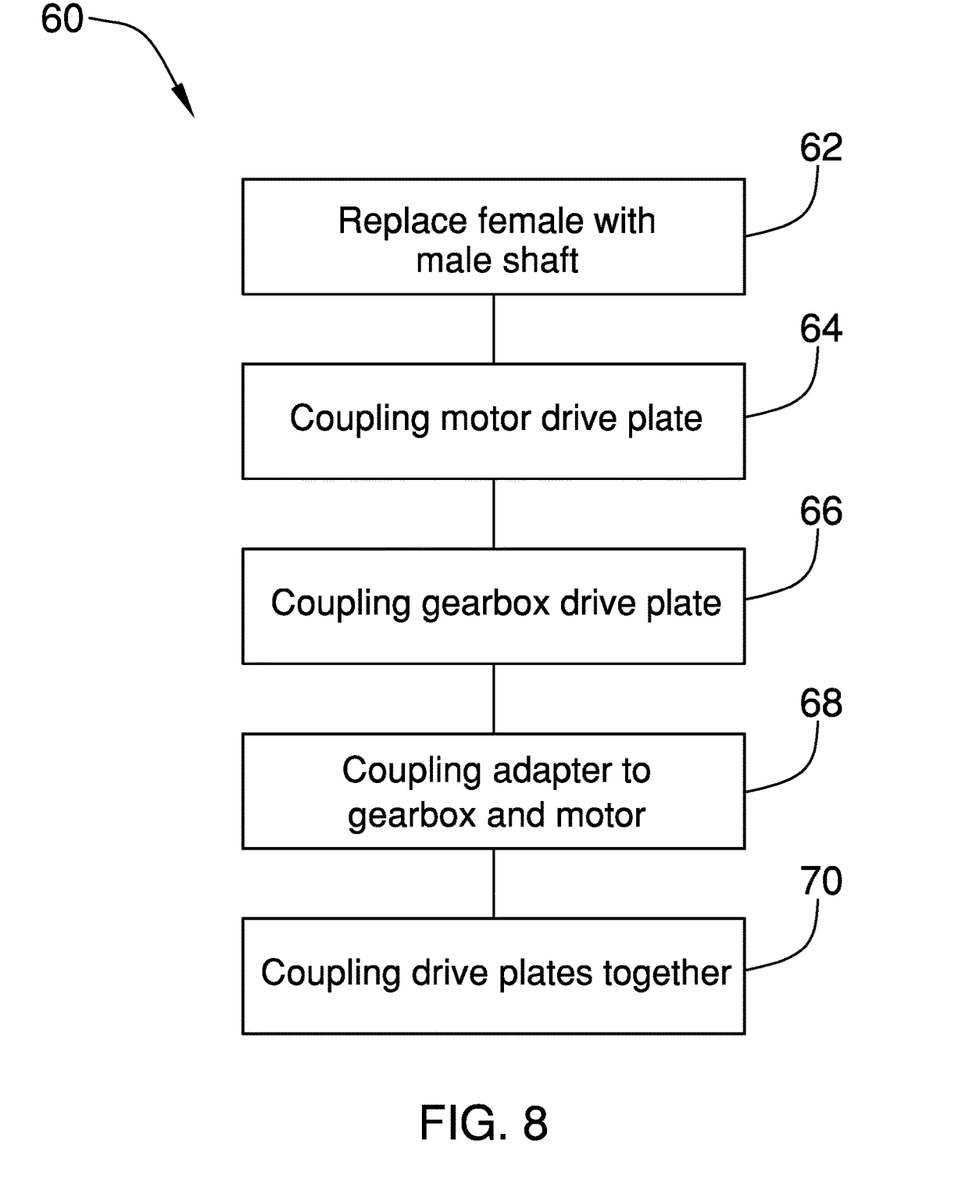
FIG. 8 is a schematic view of a method of conversion according to an embodiment of the invention.

In use, the adapter 30 stabilizes the motor drive plate 28 and gearbox drive plate 18 while allowing for rotation to be transferred the windmill drive adapter assembly 10. The connection of the motor drive plate 28 to the gearbox drive plate 18 enhances durability of the connection. The windmill drive adapter assembly 10 allows for a method 60 for converting a male to female windmill connection to a male to male windmill connection. The steps of the method 60 include a step 62 of replacing a female connector in a windmill coupling such that the windmill coupling has the gearbox shaft 14 extending from the gearbox assembly 16 and a motor shaft 24 extending from the motor assembly 26. Another step 64 is coupling the motor drive plate 28 to the motor shaft 24 using the motor hub lock 22. Still another step 66 is coupling the gearbox drive plate 18 to the gearbox shaft 14 using the gearbox hub lock 12. Yet another step 68 is coupling the adapter 30 to the gearbox assembly 16 and the motor assembly 26 such that the motor drive plate 28 and the gearbox drive plate 18 are positioned within the adapter 30. Still yet another step 70 is coupling the gearbox drive plate 18 and the motor drive plate 28 together such that the motor drive plate 28 and the gearbox drive plate 18 rotate together. The method 60 further contemplates the step 70 including coupling the motor drive plate 28 to the gearbox drive plate 18 while the gearbox drive plate 18 and the motor drive plate 28 are positioned in the adapter 30.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A windmill drive adapter assembly comprising:
   a gearbox hub lock configured for being secured to a gearbox shaft extending from a gearbox assembly;
   a gearbox drive plate, said gearbox hub lock engaging said gearbox drive plate wherein said gearbox drive plate is configured to rotate with the gearbox shaft;
   a motor hub lock configured for being secured to a motor shaft extending from a motor assembly;
   a motor drive plate, said motor hub lock being coupled to said motor drive plate such that said motor hub lock and said motor drive plate rotate together, said motor drive plate being coupled to said gearbox drive plate; and
   an adapter, said adapter having a first end being configured for coupling to the gearbox assembly, said adapter having a second end being configured for coupling to the motor assembly, said adapter being positioned around said motor drive plate and said gearbox drive plate wherein said adapter is configured to secure said gearbox drive plate and said motor drive plate in alignment with the gearbox assembly and the motor assembly, said
   adapter comprising
   a first end plate,
   a second end plate, and
   a plurality of spacers coupled to and extending between said first end plate and said second end plate.

2. The windmill drive adapter assembly of claim 1, further comprising:
   a plurality of couplers being coupled to said gearbox drive plate;
   a plurality of fasteners, each of said fasteners being engageable to an associated one of said couplers.

3. The windmill drive adapter assembly of claim 1, further comprising:
   said gearbox drive plate having a planar disc section;
   a plurality of couplers being positioned inset into said planar disc section; and
   a plurality of fasteners, each of said fasteners being engageable to an associated one of said couplers.

4. The windmill drive adapter assembly of claim 1, further comprising a coupling disc pack, said coupling disc pack being positioned between and coupling said motor hub lock to said motor drive plate.

5. The windmill drive adapter assembly of claim 1, further comprising said spacers being radially arranged and spaced around a perimeter of said adapter.

6. A windmill drive adapter assembly comprising:
   a gearbox hub lock configured for being secured to a gearbox shaft extending from a gearbox assembly;
   a gearbox drive plate, said gearbox hub lock engaging said gearbox drive plate wherein said gearbox drive plate is configured to rotate with the gearbox shaft;
   a motor hub lock configured for being secured to a motor shaft extending from a motor assembly;

a motor drive plate, said motor hub lock being coupled to said motor drive plate such that said motor hub lock and said motor drive plate rotate together, said motor drive plate being coupled to said gearbox drive plate;

an adapter, said adapter having a first end being configured for coupling to the gearbox assembly, said adapter having a second end being configured for coupling to the motor assembly, said adapter being positioned around said motor drive plate and said gearbox drive plate wherein said adapter is configured to secure said gearbox drive plate and said motor drive plate in alignment with the gearbox assembly and the motor assembly;

a plurality of couplers being coupled to said gearbox drive plate;

a plurality of fasteners, each of said fasteners being engageable to an associated one of said couplers; and said adapter having an open peripheral sidewall wherein each of said fasteners is engageable to said associated one of said couplers while said gearbox drive plate is positioned within said adapter.

7. A windmill drive adapter assembly comprising:

a gearbox hub lock configured for being secured to a gearbox shaft extending from a gearbox assembly;

a gearbox drive plate, said gearbox hub lock engaging said gearbox drive plate wherein said gearbox drive plate is configured to rotate with the gearbox shaft;

a motor hub lock configured for being secured to a motor shaft extending from a motor assembly;

a motor drive plate, said motor hub lock being coupled to said motor drive plate such that said motor hub lock and said motor drive plate rotate together, said motor drive plate being coupled to said gearbox drive plate;

an adapter, said adapter having a first end being configured for coupling to the gearbox assembly, said adapter having a second end being configured for coupling to the motor assembly, said adapter being positioned around said motor drive plate and said gearbox drive plate wherein said adapter is configured to secure said gearbox drive plate and said motor drive plate in alignment with the gearbox assembly and the motor assembly;

a plurality of couplers being coupled to said gearbox drive plate;

a plurality of fasteners, each of said fasteners being engageable to an associated one of said couplers; and a plurality of apertures extending through said motor drive plate, each of said apertures aligned with a respective one of said couplers, each of said fasteners being extended through an associated one of said apertures to engage said associated one of said couplers wherein said fasteners couple said motor drive plate to said gearbox drive plate.

8. A windmill drive adapter assembly comprising:

a gearbox hub lock configured for being secured to a gearbox shaft extending from a gearbox assembly;

a gearbox drive plate, said gearbox hub lock engaging said gearbox drive plate wherein said gearbox drive plate is configured to rotate with the gearbox shaft;

a motor hub lock configured for being secured to a motor shaft extending from a motor assembly;

a motor drive plate, said motor hub lock being coupled to said motor drive plate such that said motor hub lock and said motor drive plate rotate together, said motor drive plate being coupled to said gearbox drive plate;

an adapter, said adapter having a first end being configured for coupling to the gearbox assembly, said adapter having a second end being configured for coupling to the motor assembly, said adapter being positioned around said motor drive plate and said gearbox drive plate wherein said adapter is configured to secure said gearbox drive plate and said motor drive plate in alignment with the gearbox assembly and the motor assembly;

said gearbox drive plate having a planar disc section;

a plurality of couplers being positioned inset into said planar disc section;

a plurality of fasteners, each of said fasteners being engageable to an associated one of said couplers; and said adapter having an open peripheral sidewall wherein each of said fasteners is engageable to said associated one of said couplers while said gearbox drive plate is positioned within said adapter.

9. A windmill drive adapter assembly comprising:

a gearbox hub lock configured for being secured to a gearbox shaft extending from a gearbox assembly;

a gearbox drive plate, said gearbox hub lock engaging said gearbox drive plate wherein said gearbox drive plate is configured to rotate with the gearbox shaft;

a motor hub lock configured for being secured to a motor shaft extending from a motor assembly;

a motor drive plate, said motor hub lock being coupled to said motor drive plate such that said motor hub lock and said motor drive plate rotate together, said motor drive plate being coupled to said gearbox drive plate;

an adapter, said adapter having a first end being configured for coupling to the gearbox assembly, said adapter having a second end being configured for coupling to the motor assembly, said adapter being positioned around said motor drive plate and said gearbox drive plate wherein said adapter is configured to secure said gearbox drive plate and said motor drive plate in alignment with the gearbox assembly and the motor assembly;

said gearbox drive plate having a planar disc section;

a plurality of couplers being positioned inset into said planar disc section;

a plurality of fasteners, each of said fasteners being engageable to an associated one of said couplers; and a plurality of apertures extending through said motor drive plate, each of said apertures aligned with a respective one of said couplers, each of said fasteners being extended through an associated one of said apertures to engage said associated one of said couplers wherein said fasteners couple said motor drive plate to said gearbox drive plate.

10. A windmill drive adapter assembly comprising:

a gearbox hub lock configured for being secured to a gearbox shaft extending from a gearbox assembly;

a gearbox drive plate, said gearbox hub lock engaging said gearbox drive plate wherein said gearbox drive plate is configured to rotate with the gearbox shaft, said gearbox drive plate having a planar disc section;

a motor hub lock configured for being secured to a motor shaft extending from a motor assembly;

a motor drive plate, said motor hub lock being coupled to said motor drive plate such that said motor hub lock and said motor drive plate rotate together, said motor drive plate being coupled to said gearbox drive plate;

an adapter, said adapter having a first end being configured for coupling to the gearbox assembly, said adapter having a second end being configured for coupling to the motor assembly, said adapter being positioned around said motor drive plate and said gearbox drive plate wherein said adapter is configured to secure said gearbox drive plate and said motor drive plate in alignment with the gearbox assembly and the motor assembly, said adapter comprising a first end plate, a second end plate, and a plurality of spacers coupled to and extending between said first end plate and said second end plate, said spacers being radially arranged and spaced around a perimeter of said adapter wherein said adapter has an open peripheral sidewall wherein each of said fasteners is engageable to said associated one of said couplers while said gearbox drive plate is positioned within said adapter;

a plurality of couplers being coupled to said planar disc section, said plurality of couplers being positioned inset into said planar disc section;

a plurality of fasteners, each of said fasteners being engageable to an associated one of said couplers;

a plurality of apertures extending through said motor drive plate, each of said apertures aligned with a respective one of said couplers, each of said fasteners being extended through an associated one of said apertures to engage said associated one of said couplers wherein said fasteners couple said motor drive plate to said gearbox drive plate; and a coupling disc pack, said coupling disc pack being positioned between and coupling said motor hub lock to said motor drive plate.

11. A method for converting a male to female windmill connection to a male to male windmill connection, the steps of the method comprising:

replacing a female connector in a windmill coupling such that the windmill coupling has a gearbox shaft extending from a gearbox and a motor shaft extending from a motor;

coupling a motor drive plate to the motor shaft;

coupling a gearbox drive plate to the gearbox shaft;

coupling an adapter to said gearbox and said motor such that said motor drive plate and said gearbox drive plate are positioned within said adapter; and coupling said gearbox drive plate and said motor drive plate together such that said motor drive plate and said gearbox drive plate rotate together.

12. The method of claim 11, the steps of the method further comprising coupling said motor drive plate to said gearbox drive plate while said gearbox drive plate and said motor drive plate are positioned in said adapter.

* * * * *